Aug. 2, 1966 W. NIESWANDT ETAL 3,264,060
SIMULTANEOUS RECOVERY OF PURE AMMONIUM SULFATE AND
PURE LACTAMS FROM REARRANGEMENT
MIXTURES OF ALICYCLIC KETOXIMES
Filed April 24, 1962
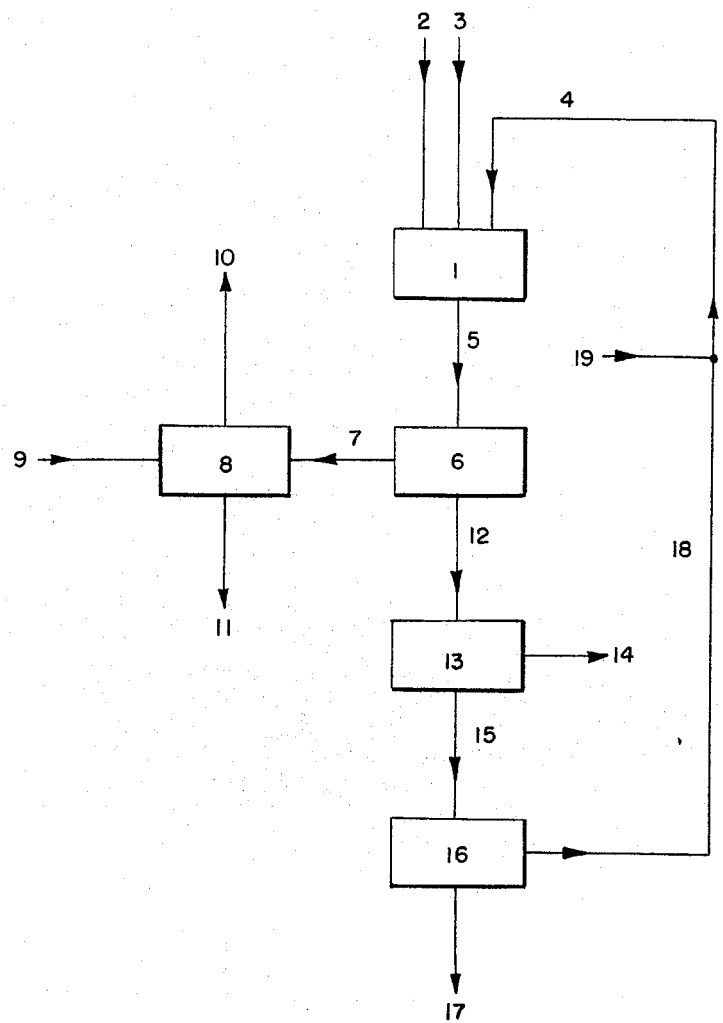
INVENTORS:
WERNER NIESWANDT
HUGO STREHLER
GUENTHER RAPP
KURT KAHR
BY Margele Johnston Cook & Root
ATT'YS

United States Patent Office 3,264,060
Patented August 2, 1966

3,264,060
SIMULTANEOUS RECOVERY OF PURE AMMONIUM SULFATE AND PURE LACTAMS FROM REARRANGEMENT MIXTURES OF ALICYCLIC KETOXIMES
Werner Nieswandt, Weinheim, Hugo Strehler and Guenther Rapp, Ludwigshafen (Rhine), and Kurt Kahr, Hambach, Weinstrasse, Germany, assignors to Badische Anilin & Soda-Fabrik Aktiengesellschaft, Ludwigshafen (Rhine), Germany
Filed Apr. 24, 1962, Ser. No. 189,831
Claims priority, application Germany, Apr. 27, 1961, B 62,294
5 Claims. (Cl. 23—119)

This invention relates to the production of ω-lactams by Beckmann rearrangement of cycloalkanone oximes with sulfuric acid. More specifically, it relates to an improvement which permits the simultaneous recovery of pure ω-lactams and pure ammonium sulfate.

Conventional production of lactams by Beckmann rearrangement of oximes of cycloaliphatic ketones is preferably carried out with the use of concentrated sulfuric acid or oleum, at a temperature of between 80° and 130° C. and using a weight ratio of oxime to sulfuric acid or oleum of about 1:1 or an excess of sulfuric acid or oleum. To isolate the lactams, the acidic solution is neutralized, preferably with ammonia, and an ammonium sulfate solution and a lactam layer are obtained. Advantageously, part of this ammonium sulfate solution is returned to the neutralization zone, while the remaining portion is processed for recovery of solid ammonium sulfate. Pure commercial-grade ammonium sulfate can be obtained from such ammonium sulfate solutions only with great wastage, because the water-soluble impurities formed during the rearrangement of the oximes collect in the mother liquor. Moreover, the ammonium sulfate solution contains a certain amount of dissolved lactam, so that extraction of the ammonium sulfate solution, for example with benzene, is necessary before the ammonium sulfate can be crystallized from the solution.

In a known variant of this process, only such an amount of water is present during neutralization that the ammonium sulfate formed is deposited in crystalline form. The ammonium sulfate is obtained as very fine crystals and can be separated only with difficulty from the neutralization mixture, which contains two liquid phases.

By the known methods it is only possible to obtain either pure lactams and impure ammonium sulfate or impure lactams and pure ammonium sulfate in varying yields together with an unusable ammonium sulfate mother liquor.

It is an object of this invention to provide a process for Beckmann rearrangement of cycloalkanone oximes with sulfuric acid or oleum by which it is possible to obtain simultaneously pure ω-lactams and pure ammonium sulfate.

Further objects and advantages of this invention will become apparent from the following detailed description in conjunction with the accompanying drawing, which represents a flow sheet of a plant in which the process according to the invention may be carried out.

The objects of our invention are accomplished by combination of the following process steps:

Neutralizing the reaction mixture which has been obtained by Beckmann rearrangement of a cycloalkanone oxime having from 6 to 10 ring carbon atoms with sulfuric acid containing from 98 to 100% by weight of $H_2SO_4$ or oleum containing up to 35% by weight of free $SO_3$ and which contains about 30 to 50% by weight of lactam having from 7 to 11 ring members and 70 to 50% by weight of sulfuric acid by contacting said reaction mixture with ammonia in the presence of 5 to 50 times the amount (with reference to the weight of reaction mixture) of an ammonium sulfate having a concentration of from 25 to 45% by weight; separating the aqueous crude lactam from the ammonium sulfate solution; concentrating the ammonium sulfate solution, advantageously under reduced pressure, until such an amount of ammonium sulfate has precipitated as corresponds to the amont of sulfuric acid introduced with the reaction mixture; separating the crystalized ammonium sulfate, advantageously at 20 to 50° C.; diluting the mother liquor with such an amount of water as is necessary to restore the ammonium sulfate solution to its original concentration (as a rule, 1 to 2 parts of water is required per part of ammonium sulfate separated); returning this ammonium sulfate solution to the neutralization zone; extracting the separated aqueous crude lactam with at least three times its weight of benzene, toluene or xylene; separating the resultant aqueous phase; and distilling the lactam solution obtained.

It was not to be foreseen that, in addition to obtaining a quantitative yield of ammonium sulfate of excellent quality, it would be possible in a simple manner to separate the impurities and recover pure lactam in good yield from the heavily contaminated crude lactam by extracting it with benzene, toluene or xylene.

The process will now be described in greater detail with reference to the accompanying flow sheet.

Into a neutralization zone 1, rearrangement mixture is introduced through a pipe 2, ammonia through a pipe 3, and dilute ammonium sulfate solution through a pipe 4.

The rearrangement mixture may be, for example, a mixture obtained by Beckmann rearrangement of cyclohexanone oxime, cyclooctanone oxime or cyclodecanone oxime. The ammonia for neutralization may be used in gaseous form or as an aqueous solution containing, for example, from 10 to 20% by weight of ammonia. The ammonia and the ammonium sulfate solution may be brought together ahead of the neutralization zone, but also within the neutralization zone. The pH value in the neutralization zone is advantageously adjusted to 3 to 6 by adding ammonia. Neutralization is effected with intense mixing, for example in a mixing pipe. Other mixing means, for example a turbomixer, may however also be used. The neutralization temperature is maintained at between about 30° and 100° C., advantageously between 30° and 70° C. The concentration of the ammonium sulfate solution used is at most such that an almost saturated solution is formed after neutralization. Concentrations of from 20 to 45% by weight have given good results. Precipitation of ammonium sulfate is avoided by suitable choice of the temperature and concentration conditions.

The neutralization mixture is then passed through a pipe 5 into a separation zone 6, where the two liquid phases, i.e. the aqueous crude lactam and the aqueous ammonium sulfate solution, are separated. After the mixture has parted into two layers, the two phases may be separated, for example, simply by drawing off one phase or by means of separators.

The lighter phase, which contains the aqueous crude lactam, is passed through a pipe 7 into an extraction zone 8, where it is extracted with benzene at a temperature of between about 20° and 50° C. In this way, a benzene solution of the lactam is obtained, and the water separates out. Instead of benzene, homologous aromatic hydrocarbons, such as toluene or xylene, may be used. At least three times the amount of benzene is used, so that the concentration of the lactam solution is at most 25%. It is preferred, however, to use 4.5 to 12 times the amount of benzene, so that solutions containing about 5 to 15% lactam are obtained. The extraction of the lactam with benzene may be carried out either as a one-stage or as a multi-stage operation.

It is advantageous to use the countercurrent extraction method. For example, the crude lactam may be fed to a sieve-plate tower through which benzene is flowing (introduced through a pipe 9). At the top of the tower, there is obtained a benzene solution of the lactam, which is passed through a pipe 10 for processing. In the lower part of the tower (at 11), an aqueous solution practically free from lactam is obtained which contains a small amount of ammonium sulfate and practically all the impurities from the crude lactam. In the case of ε-caprolactam, the amount of aqueous solution is about 32% by weight, and in the case of caprylolactam about 15% by weight, of the crude lactam separated.

The ammonium sulfate solution separated in separation zone 6 is passed through a pipe 12 to an evaporator 13, in which part of the water is evaporated and removed at 14. In principle, various designs of evaporator may be used. Since, however, it is desired to recycle the ammonium sulfate mother liquor at the lowest possible temperature without extra cooling, it is advantageous to carry out the evaporation under reduced pressure, for example at 30 to 90 mm. Hg, preferably in a vacuum circulation evaporator. The heat required for evaporation may be supplied wholly or partly by the heat content of the ammonium sulfate solution, cooling of the solution and hence supersaturation occurring at the same time. When conventional liquid-seal pumps are used to produce the vacuum, the temperature of the ammonium sulfate solution may be lowered in this manner to about 30° C. This cooling is of advantage also for the subsequent reuse of the solution in neutralization zone 1, because the heat of neutralization can easily be controlled in this manner. As a result of the evaporation of water and any cooling which may occur, the ammonium sulfate solution becomes supersaturated and ammonium sulfate crystallizes out. The solution is evaporated only to such an extent that the amount of ammonium sulfate crystallizing out is equal to the amount of ammonium sulfate formed by neutralization, i.e. corresponds to the amount of sulfuric acid introduced with the reaction mixture. Accordingly, water is evaporated at such a rate that, at constant temperature, the volume of recycled ammonium sulfate solution is maintained constant. This means that the amount of water introduced into the system as diluent and/or in the form of aqueous ammonia solution is equal to the amount of water withdrawn from the system by separation of the aqueous crude lactam solution and by concentration of the ammonium sulfate solution. The salt slurry is passed through a pipe 15 to a separator 16, for example a filter or a centrifuge. It is, however, also possible first to enrich the slurry in solids, for example by sedimentation, and to pass only the portion rich in solids to the filter or centrifuge, while the clear solution obtained in the enrichment step is combined with the filtrate. The ammonium sulfate is discharged at 17 in substantially dry condition. The filtrate is returned to the neutralization zone through a pipe 18, after it has been mixed with water introduced through a pipe 19 (condensate obtained at 14 from the concentration zone may likewise be used for this purpose). Also the water which passes into the benzene solution together with the lactam and is thus withdrawn from the circulation is replaced through pipe 19. The rule for the ratio of saturated ammonium sulfate solution (mother liquor) to diluent water is that at least such an amount of water should be added that no precipitation of ammonium sulfate occurs during neutralization.

It is, however, also possible to pass to the evaporator and crystallizer only part, for example 30 to 70%, of the ammonium sulfate solution obtained by separation of the crude lactam, to remove crystalline ammonium sulfate from this portion of the ammonium sulfate solution at the same rate as ammonium sulfate is formed in the neutralization zone, and to combine the resultant mother liquor with the portion of the ammonium sulfate solution which has not been passed to the evaporator and, after dilution with water, return it to the neutralization zone. Also in this procedure, the whole of the mother liquor obtained is recycled, so that no mother liquor is withdrawn from the process.

Because of the temperature dependence of the solubility of ammonium sulfate, the minimum amount of diluent water depends on the temperature reached during neutralization and also on the desired final concentration of the ammonium sulfate solution. In general, 1.0 to 1.5 parts of diluent water per part of ammonium sulfate expected is sufficient. Moreover, the water removed with the crude lactam must be replaced, so that 1.0 to 2.0 parts of water is added per part by weight of crystallized ammonium sulfate. If aqueous ammonia solution is used for neutralization, the water thus added must be taken into account.

Mixing the ammonia or ammonia solution with the ammonium sulfate mother liquor may be carried out prior to neutralization (i.e. through pipe 19), or the ammonium sulfate solution may be returned undiluted and the ammonia water introduced direct into the neutralization zone (through pipe 3). When aqueous ammonia solution is used, it is in many cases unnecessary to add extra water for dilution of the ammonium sulfate mother liquor.

The amount of mother liquor returned, and hence the ratio of mother liquor to diluent water, is of considerable importance for the temperature increase which occurs during neutralization. If this temperature rise is to be 40° to 10° C., about five to fifty times the amount of mother liquor (with reference to the weight of rearrangement mixture) is used. Taking into account the ammonium sulfate, a ratio of about 5:1 to 65:1 results for the ratio of mother liquor to diluent water.

The ammonium sulfate obtained on filtration or centrifuging is of pure white color and coarsely crystalline. It can be used without further purification.

The benzene solution of the lactam is processed in conventional manner, for example by distillation, if desired with the addition of water or strongly diluted caustic soda solution. It may also be subjected to another purification step prior to distillation, for example to a water wash.

The outstanding advantage of the process according to this invention, as compared with all known methods, is that no ammonium sulfate mother liquor is obtained that cannot be utilized.

The invention will be further illustrated by, but is not limited to, the following examples. Unless otherwise specified, parts are by weight. Parts by weight bear the same relation to parts by volume as the kilogram to the liter measured at standard conditions.

*Example 1*

6.2 parts per hour of cyclohexanone oxime rearrangement mixture, composed of 42.7% caprolactam and 57.3% sulfuric acid, and 1610 parts by volume of ammonia gas per hour are introduced separately into an ammonium sulfate solution which has a concentration of about 40% and a temperature of 40° C. and which is recycled at the rate of 200 parts per hour. The resultant neutralization mixture is maintained at a pH of about 5, the temperature rising to about 50° C. The mixture then flows into a separator in which 3.86 parts per hour of oily, aqueous crude caprolactam containing about 68% of caprolactam (lighter phase) and 203.5 parts per hour of concentrated ammonium sulfate solution (heavier phase) are separated from each other. In a crystallizer under a pressure of 40 mm. Hg, 2.7 parts per hour of water is evaporated from the concentrated ammonium sulfate solution. The contents of the crystallizer are thereby cooled to about 40° C., and supersaturation and crystallization occur. From the resultant salt mixture, 4.7 parts per hour of coarsely crystalline ammonium sulfate of pure white color is separated in a separator and a centrifuge. The mother liquor (196 parts per hour) is diluted with 4.0 parts by volume of water and returned to the neutralization zone.

The aqueous crude lactam is extracted at 40° C. with 21.6 parts per hour of benzene in a sieve-plate tower having 24 extraction plates and 4 washing plates. 24.2 parts per hour of a 10.8% benzene solution of caprolactam overflows at the top of the tower, while 1.2 parts per hour of a dark-coloured aqueous solution of the impurities containing about 0.2% of caprolactam leaves at the lower part of the tower. From the benzene solution of the lactam, so much benzene is distilled off that there remains about 25% by weight of benzene (with reference to benzene solution). After the addition of a small amount of 0.5% caustic soda solution, the remainder of the benzene is likewise removed by distillation, so that an aqueous benzene-free lactam is obtained. On distillation of this aqueous lactam, 2.50 parts per hour of caprolactam is obtained.

*Example 2*

3.1 parts per hour of cyclooctanone oxime rearrangement mixture, composed of 41% caprylolactam and 59% sulfuric acid, and 6 parts per hour of 10.6% ammonia water are introduced saparately into an ammonium sulfate mother liquor which has a concentration of 45% by weight and a temperature of 45° C. and which is recycled at the rate of 46.7 parts per hour. The resultant neutralization mixture is maintained at a pH of 4.5, a temperature of 65° C. being set up. The mixture then flows into a separator in which 1.5 parts per hour of aqueous crude caprylolactam containing about 85% of caprylolactam (lighter phase) and 54.3 parts per hour of concentrated ammonium sulfate solution (heavier phase) are separated from each other. The concentrated ammonium sulfate solution passes into a crystallizer which is under a pressure of 50 mm. Hg. In the crystallizer, 1.85 parts per hour of water is evaporated from the concentrated ammonium sulfate solution. The contents of the crystallizer are thereby cooled to about 45° C., and supersaturation and crystallization occur. The resultant salt mixture is separated, in a separator and a centrifuge, into 2.40 parts per hour of coarsely crystalline ammonium sulfate of pure white color and 46.7 parts per hour of saturated mother liquor, which is returned to the neutralization zone.

The aqueous crude lactam solution is extracted with 9 parts per hour of benzene as described in Example 1, 10.2 parts per hour of a pure benzene solution of caprylolactam being obtained. On distillation, 1.27 parts per hour of caprylolactam is obtained.

We claim:

1. A process for the simultaneous recovery of pure ammonium sulfate and pure lactam having from seven to eleven ring members from a mixture which has been obtained by Beckmann rearrangement of a cycloalkanone oxime having from six to ten ring carbon atoms with a compound selected from the group consisting of sulfuric acid containing from 98 to 100% by weight of $H_2SO_4$ and oleum containing from 0 to 35% by weight of free $SO_3$ and which contains from 30 to 50% by weight of lactam, which process comprises neutralizing the rearrangement mixture with ammonia in the presence of five to fifty times the amount (with reference to the weight of rearrangement mixture) of a 25 to 45 weight percent ammonium sulfate solution at a neutralization temperature of 30° to 100° C. forming two liquid phases composed of crude aqueous lactam and ammonium sulfate solution separating the crude aqueous lactam phase from the ammonium sulfate solution phase, concentrating the separated ammonium sulfate solution by evaporation until such an amount of ammonium sulfate has precipitated as corresponds to the amount of sulfuric acid introduced with the reaction mixture, separating the crystallized ammonium sulfate in the form of pure ammonium sulfate crystals, diluting all of the mother liquor with such an amount of water as is necessary to restore the ammonium sulfate solution to a 25 to 45 weight percent ammonium sulfate solution, recycling all of the diluted mother liquor to the neutralization zone, extracting the separated crude lactam phase with from three to twelve times its weight of an aromatic hydrocarbon selected from the group consisting of benzene, toluene and xylene, separating the resultant aqueous phase, which is a water solution of the impurities in said separated crude lactam, and distilling the lactam solution obtained to recover the pure lactam.

2. A process as claimed in claim 1, wherein concentration of the ammonium sulfate solution is effected by evaporation under reduced pressure.

3. A process as claimed in claim 1, wherein extraction of the separated crude lactam is carried out by the countercurrent method.

4. A process as claimed in claim 1, wherein the ammonia for neutralization is used in the form of a 10 to 20 weight percent aqueous solution.

5. A process as claimed in claim 1, wherein only part of the ammonium sulfate solution is concentrated by evaporation until such an amount of ammonium sulfate has precipitated as corresponds to the amount of sulfuric acid introduced with the reaction mixture, the crystallized ammonium sulfate is separated, the filtrate is combined with the remainder of the ammonium sulfate solution which has not been concentrated, and the combined solution is diluted with water and returned to the neutralization zone.

References Cited by the Examiner

UNITED STATES PATENTS

| | | | |
|---|---|---|---|
| 2,605,261 | 7/1952 | Kahr | 260—239.3 |
| 2,966,394 | 12/1960 | Van Ackern | 23—119 |
| 2,973,355 | 2/1961 | Bauer | 260—239.3 |

OSCAR R. VERTIZ, *Primary Examiner.*

MAURICE A. BRINDISI, BENJAMIN HENKIN,
*Examiners.*

E. C. THOMAS, *Assistant Examiner.*